United States Patent
Günther

(10) Patent No.: US 6,619,948 B2
(45) Date of Patent: Sep. 16, 2003

(54) HOT RUNNER NOZZLE

(75) Inventor: Herbert Günther, Alllendorf/Eder (DE)

(73) Assignee: Gunther Heisskanaltechnik GmbH, Frankenberg/Eder (DE)

(*) Notice: Subject to any disclaimer, the term of this patent is extended or adjusted under 35 U.S.C. 154(b) by 31 days.

(21) Appl. No.: 10/044,952

(22) Filed: Jan. 15, 2002

(65) Prior Publication Data

US 2002/0102322 A1 Aug. 1, 2002

(30) Foreign Application Priority Data

Jan. 16, 2001 (DE) .......................................... 20100840

(51) Int. Cl.⁷ .............................................. B29C 35/00
(52) U.S. Cl. .................. 425/549; 264/328.15; 425/572
(58) Field of Search ................. 425/548, 549, 425/572; 264/328.15

(56) References Cited

U.S. PATENT DOCUMENTS 6,022,210 A * 2/2000 Gunther ...................... 425/549
6,045,742 A * 4/2000 McGrevy ............... 264/328.15

* cited by examiner

Primary Examiner—Tim Heitbrink
(74) Attorney, Agent, or Firm—Clark & Brody

(57) ABSTRACT

A hot runner nozzle for an injection mold with a material pipe made of a high-strength material, which may be mounted on a mold or manifold has at least one flow duct for a melt and a nozzle tip at its lower end. A heater for the melt is attached onto the periphery of the material pipe, the heater being designed as a solid block made of a highly heat-conductive material and comprising a first receiving channel for the material pipe and at least one other receiving channel for a linear heating element, which other channel is substantially parallel to the first receiving channel. This heating assembly ensures a surprisingly uniform and homogeneous temperature distribution in the material pipe down to the nozzle tip.

25 Claims, 5 Drawing Sheets

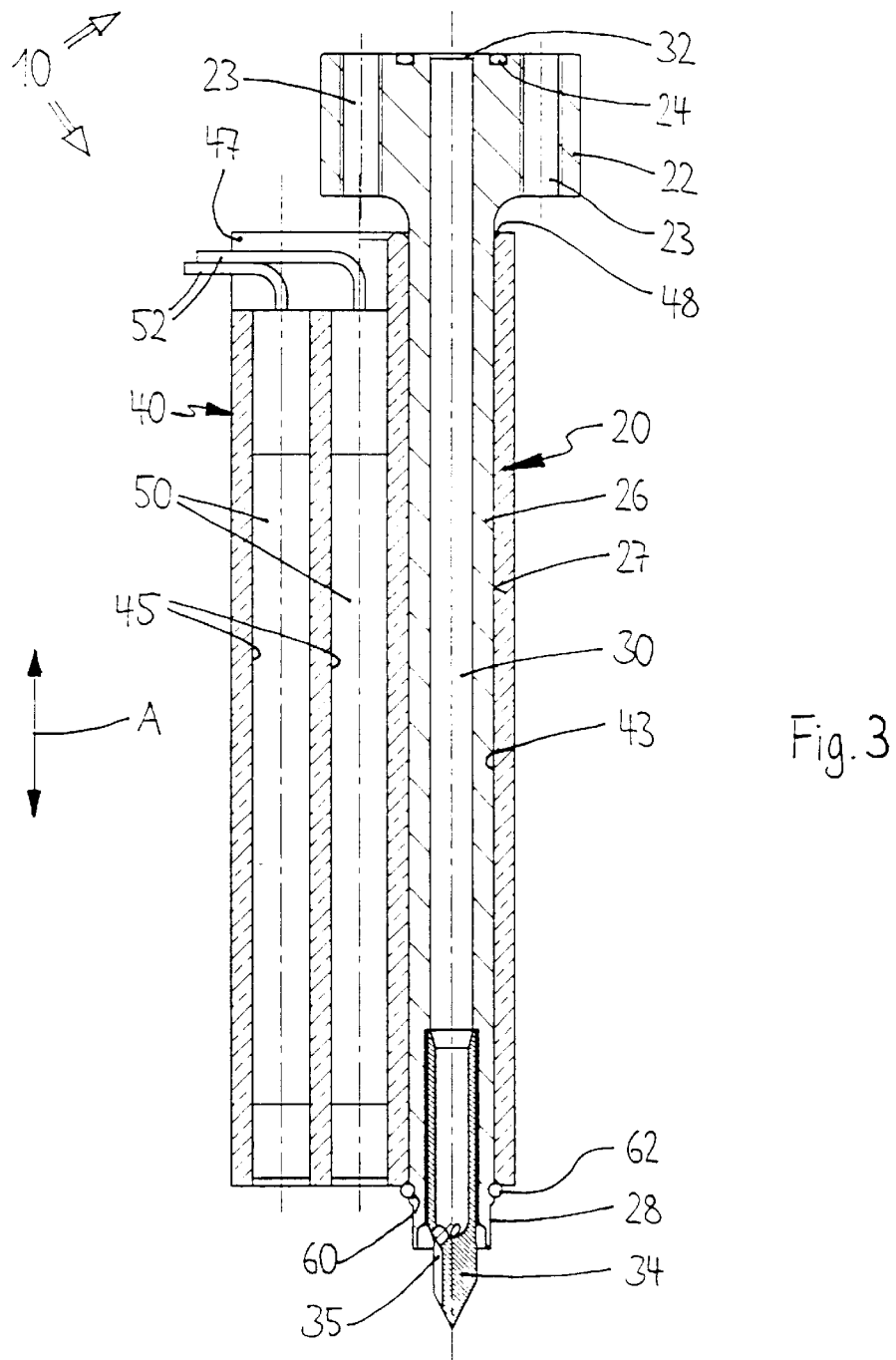

HOT RUNNER NOZZLE

FIELD OF THE INVENTION

BACKGROUND OF THE INVENTION

The invention relates to a hot runner nozzle according to the generic term of claim 1.

Hot runner nozzles are generally known. They are used in injection molds for feeding a flowable plastic material at a predefinable temperature under high pressure to a separable mold block (cavity). In order that the usually hot compound would not cool down prematurely within the nozzle, an electic heater is usually provided which concentrically encloses a material pipe and a flow channel formed therein, respectively and which is to hold the liquid plastic material at a constant temperature down to the nozzle tip if possible. A thermal separation between a hot manifold and the less warm mold ensures that the nozzle—especially in the zone of the nozzle tip—will not freeze and, at the same time, that the mold (or cavity) will not be heated up. A temperature sensor is normally used for temperature control.

The material pipe and the heater are often designed as separate components, the heater together with the temperature sensor being integrable in a jacket which may be peripherally attached onto the nozzle body. As disclosed e.g. in DE-U1-295 07 848, the jacket is a rigid structure which receives an electrically activated helix-shaped heating conductor and which may be fastened in an axial direction onto the nozzle body exterior in axial direction by means of holders or clamping elements. Alternatively flexible heating strips or mats are used which are fixed on the nozzle body (see e g. EP-B1-0 028 153 or WO 97/03540).

EP-B1-0 724 943 describes a hot runner nozzle comprising a heater designed as a preassembled heating unit with a cast body to be concentrically attached onto a material pipe. The heater is provided with a coiled filament centered by means of a perforated metal sheet, which filament forms a solid block together with the brass cast which block is then provided with a concentric bore to receive the material pipe. The manufacture of such heating systems is relatively complicated and expensive, what with special problems arising when a defective heater has to be replaced. Moreover, it is always necessary to replace the complete heating unit because the normally damaged filament is included in a cast. Consequently, purchase and spare parts costs are high.

Another disadvantage of conventional heating devices is that the heater which concentrically encloses the material pipe takes relatively much room so that the nozzles cannot be arranged side by side as closely as perhaps desired. But many applications require that the spaces between the cavities are as small as possible so that separate cavities might be filled simultaneously or more complicated components might be filled by several shots at short distances.

To overcome this disadvantage, DE-U1-296 10 268 suggests to arrange the nozzle channel and the heater side by side in a common casing. An altogether flat, T-shaped casing comprises a base piece and a shaft piece whose free end winds up in a nozzle tip. Parallel to the straight nozzle runner, the casing is provided with a bore for receiving the heating unit designed as a rod-shaped heater that almost reaches to the nozzle tip. A problem of this arrangement is, however, that the complete casing consists of a uniform material—normally tool steel—which has a negative effect on the heat distribution. Consequently the heating elements are often susceptible to trouble because the power, owing to the poor heat conductivity, is transferred to the casing to a limited extent only. This will result in frequent failures of the hot runner nozzle.

BRIEF SUMMARY OF THE INVENTION

It is an object of the invention to overcome these and other disadvantages of the prior art and to create a hot runner nozzle having uniform heat-transition and temperature distribution curves and requiring little space when incorporated in a mold. Another object is the realization of a structure that can be manufactured and mounted economically and that guarantees reliable operation. Also aimed at is a nozzle layout with an arrangement of closely packed hot runner nozzles adapted to be produced at low cost and to be mounted quickly, reliable functioning also being very important.

In a hot runner nozzle for an injection mold with a material pipe made of a high-strength material, which may be mounted on a mold or manifold and is provided inside with at least one flow duct for a melt and at its lower end with a nozzle tip, and which comprises a heater for the melt to be attached onto the periphery of the material pipe, the invention provides that the heater is designed as a solid block made of a highly heat-conductive material and comprises a first receiving channel for the material pipe and at least one other receiving channel for a linear heating element, which other channel is substantially parallel to the first receiving channel. This extremely simple and cheaply realizable heating assembly ensures a surprisingly uniform and homogeneous temperature distribution in the material pipe down to the nozzle tip. The temperature set is maintained over the complete nozzle length, which fact will result in good final products.

This effect is also furthered if, in addition to the first receiving channel, at least two other receiving channels for heating elements are provided on one side or on both sides. Thus the necessary heating power may be easily distributed to several heating elements which may have smaller dimensions. This will have a positive effect on the service life of the heating system. The hot runner nozzles will always function reliably.

Moreover, the parallel arrangement of the receiving channels inside the heat-transferring block at a right angle to the axial direction requires little space so that several hot runner nozzles may be arranged closely side by side. Because of the small distances between the nozzles, such a row of nozzles may easily feed several cavities or several gates; extremely small distances between the cavities or gates, respectively, may be selected at least in a direction at a right angle to the axial direction.

Within the solid block the receiving channels may be aligned in one plane or be staggered radially and/or in relation to a longitudinal direction of the nozzle in order to create, for example, enough space for a temperature sensor. The spaces between the nozzles will not be increased by this arrangement.

Another essential advantage of the hot runner nozzle according to the invention is that the material pipe and the heating element, depending on the respective operating conditions, can be manufactured separately and from different materials, which will have a positive effect on the manufacturing costs. The heating elements may be inserted separately into the highly heat-conductive heater and may be replaced as required without requiring special dismantling work. The heating consists rather of a flat heater with quickly replaceable heating elements. It lends itself to manufacture by a few operations and may be attached to the pressure-tight material pipe non-positively or positively.

In order that the diameters of the heating elements and of the material pipes be variable, the cross-section of the solid block is smaller in the zone of the first receiving channel than in the zone of the other receiving channel(s), i.e. the solid block may be wider in the zone of the heating elements so that these may have larger dimensions. At the same time, the narrow spaces between the nozzle tips of neighboring hot runner nozzles will not increase so that small distances between cavities may still be realized.

The heating element is preferably an electric heating cartridge suitable to be connected by means of terminals to a control circuit known per se. However, the heating element may also consist of a pipe segment through which a heating medium is passed and which may either be inserted into the solid block or be formed thereby.

The material pipe is of substantially circular cross-section and may be inserted non-positively or positively into the first receiving channel of the solid block. Consequently, that channel may be designed as a bore which is easily made.

In order to be able to sense the temperature generated by the heater, the solid block is provided with at least one additional receiving channel for a temperature sensor.

Another important feature of the invention is that the solid block be fixed in relation to the material pipe. Thus it is avoided that the heater would be displaced or would inadvertently slip off the material pipe. For this purpose, the latter is preferably provided at its end with a peripheral groove into which a clamping element, e.g. a spring washer, is positively inserted. The outer diameter of the spring washer is greater than the outer diameter of the material pipe so that one end of the solid block rests on the spring washer and cannot slip off. Alternatively the spring washer may engage into the solid block non-positively or positively.

Still another aspect of the invention provides that a connecting piece of the material pipe has several shaft pieces arranged comb-like, each shaft piece being equipped with a solid block heater. Thus the individual nozzles form a nozzle battery with extremely small nozzle distances in a longitudinal direction. As each individual nozzle has its own heating, all nozzle channels may be individually supplied with the heating energy required.

Optimum heat transition is achieved if solid blocks or at least sections thereof are designed to be integral, each shaft piece being provided with a separate receiving channel and at least one other receiving channel for a heating element.

For their control, the heating elements are associated to separate control circuits each. However, it is also possible to assign groups of several heating elements to a common control circuit, whereby expenditures for control equipment will be reduced accordingly.

With a multiple-nozzle arrangement, the individual nozzles are arranged in close packing side by side, their side surfaces contacting each other, which will also result in extremely small distances between the cavities.

BRIEF DESCRIPTION OF THE DRAWINGS

Further features, details and advantages of the invention will follow from the wording of the claims as well as from the following description of embodiments on the basis of the drawings wherein:

FIG. 3 is a lateral sectional view of another embodiment of a hot runner nozzle, FIG. 4 is a bottom view of the hot runner nozzle in FIG. 3.

DETAILED DESCRIPTION OF THE INVENTION

Figure 1:
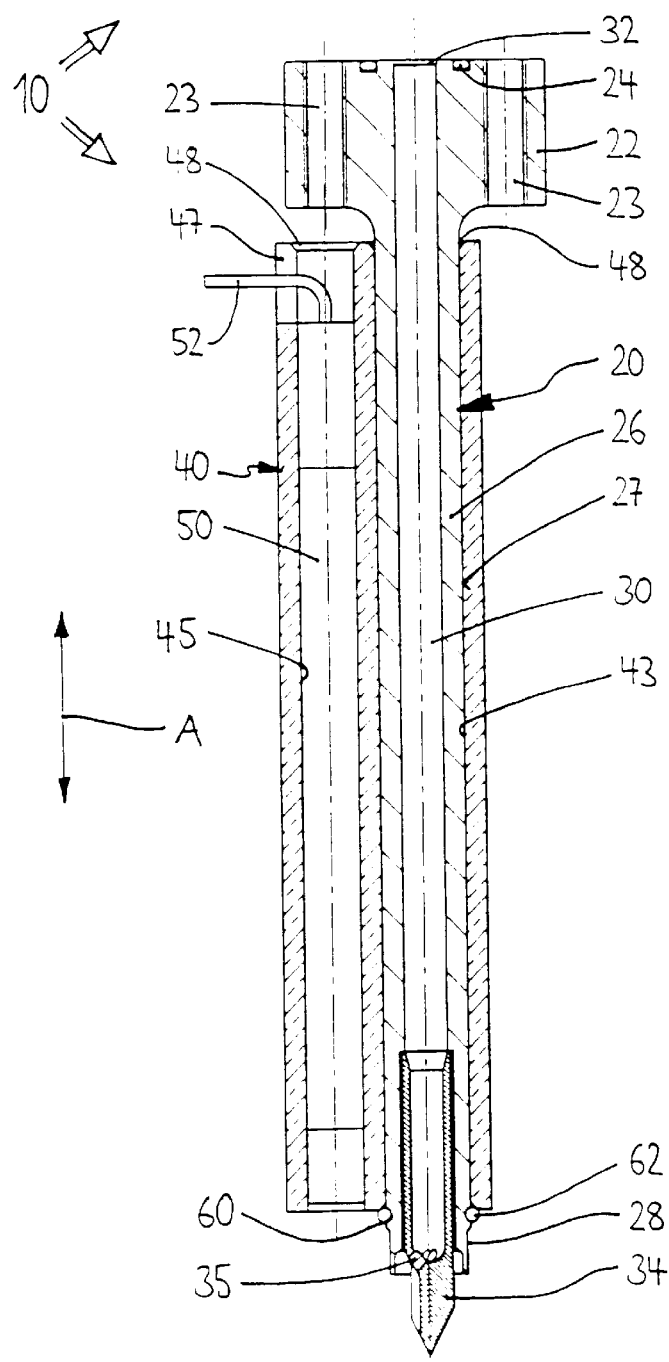
FIG. 1 is a lateral sectional view of a hot runner nozzle.

The hot runner nozzle generally designated by 10 in FIG. 1 has a material pipe 20 of round cross section, which is made of a high-strength material—tool steel, for example—, with a laterally flattened connecting head 22 and a narrower shaft 26 of circular cross-section bordering axially downward. The width b of the connecting head 22 at a right angle to the longitudinal direction L is only slightly greater than the diameter of the shaft 26 so that the material pipe 20 is altogether relatively narrow. The connecting head 22 is laterally provided with two tapped holes 23 for receiving suitable fastening screws (not shown) in order to mount the hot runner nozzle 10 on a hot runner mold or a hot runner manifold (not shown)

Within the material pipe 20, which extends in an axial direction A, there is centrally arranged a melt flow duct 30 preferably designed as a bore. In its connecting head 22, the duct 30 comprises a material inlet opening 32. Its lower end forms a nozzle tip 34 which conveys the melt into a die cavity (not shown) through at least one material outlet opening 35. The end of nozzle tip 34, which is preferably made of a highly heat-conductive material, is inserted into the material pipe 20, especially screwed in. Depending on the mode of use, however, it may also form one piece with the material pipe 20, which arrangement functions in the same way.

For sealing the hot runner nozzle 10 against the mold or manifold, respectively, a sealing ring 24 is provided in the connecting head 22 of the material pipe 20 concentrically to the inlet opening 32. Also conceivable is the formation of an additional annular centering attachment (not shown) for facilitating the mounting of the nozzle 10 on the mold.

Figure 2:
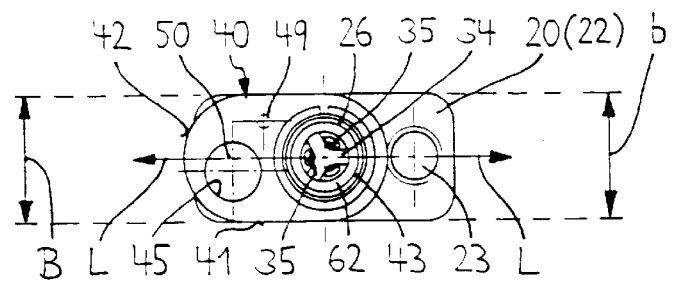
FIG. 2 is a bottom view of the hot runner nozzle in FIG. 1.

Attached on the periphery of the material pipe shaft 26 is a heater 40. It has the shape of a flat solid block which extends over almost the complete axial length of the shaft 26 and whose width B at a right angle to the longitudinal length L does not exceed the width b of the connecting head 22 of the material pipe 20. This ensures that the hot runner nozzle 10 is very narrow on the whole. It will be seen in FIG. 2 that the longitudinal sides or surfaces 41 of the solid block 40, which has an oblong cross-section, are plane whereas the short sides 42 may be rounded according to the contour of the material pipe 20. But it is also possible to make the complete solid block 40 round first and then to flatten the sides until the width B corresponds to the width b of the connecting head 22.

Within the solid block 40, which extends in axial direction A and is made of a highly heat-conductive material such as copper or brass, there is a first receiving channel 43 in the form of a through-hole receiving the material pipe 20. The inner diameter of this through-hole is slightly smaller than the outer diameter of the shaft 26 so that this shaft will always be fully and positively enclosed by the heater 40.

Parallel to the first channel 43, the block-type heater 40 comprises a further receiving channel 45 which may be round or square for housing a linear heating element 50. In the embodiment shown in FIG. 1, the heating element 50 is a heating cartridge of cylindrical shape which extends almost over the complete axial length of the heater 40 and down into the zone of the nozzle tip 34. The heating cartridge is provided with electric connections 52 which are laterally led out of the heater 40 through a hole 47 for connection to a control circuit (not shown). The outer diameter of the heating cartridge 50 is slightly greater than the inner diameter of the receiving bore 45, which is preferably open at both ends, so that the heating cartridge 50 is enclosed by the highly heat-conductive material of the solid block 40, thus always having good heat contact. There is an optimum transfer at all times of the heating power produced by the heating cartridge 50 to the solid block 40 and from there directly to the material pipe 20.

Alternatively the heating element 50 can be a pipe segment (not shown) through which a heating medium, e.g. water or oil, may be passed. This pipe segment is inserted into the receiving channel 45 and connected at its ends to lateral connections (also not shown).

However, the receiving channel 45 may also directly serve as pipe segment by tightly closing both ends and leading lateral connections out in the end zones.

For sensing the temperature generated by the heater 40, an additional receiving channel 49 is provided in the solid block 40 directly adjacent to the material pipe 20. A temperature sensor (not shown) may be inserted into said channel, its connections (not shown) being also led out laterally away from the heater 40 in the longitudinal direction.

In order that the heater 40 would not move in relation to the material pipe 20 or even slip off, the latter is provided at its end with a peripheral groove 60 into which a clamping element 62, e.g. a peripherally slotted spring washer, is positively inserted. As shown in FIG. 1, the outer diameter of the spring washer 62 is greater than the outer diameter of the material pipe 20 so that the end of the solid block 40 will rest on the spring washer 62. Below the latter, the material pipe 20 may have a recess at its end, thus creating a peripheral outer diameter step 28. This will e.g. serve for centering the hot runner nozzle 10 in the mold.

Manufacturing and mounting of the hot runner nozzle 10 is extremely easy and and economical. First the solid heater 40 is milled and provided with the necessary bores 43, 45. Then the heating cartridge 50 is pressed into the corresponding receiving bore 45 non-positively and positively with the connections 52 being led out through the lateral openings 47. The heater 40, which may be prefabricated in this way extremely efficiently and cheaply, is now attached to the material pipe 20 from below, the shaft 26 tightly held in the receiving channel 43 owing to the defined fit. For further securing of the heater 40, the spring washer 62 is put on the material pipe 20 from below and locked in the peripheral groove 60. In order to even further simplify mounting of the hot runner nozzle 20, the insertion openings 48 of the receiving bores 43, 35 in the solid block 40 may be slightly chamfered.

If a heating cartridge breaks down, it can be quickly and conveniently be replaced. For this purpose, the solid body 40 is first drawn off the material pipe 20 after removal of the spring washer 62. Now the defective heating cartridge 50 is replaced by a new one and the heater 40 is reinstalled on the material pipe 20. The complete repair will take little time. Since merely the defective heating cartridge 50 has to be replaced, spare part costs are insignificant.

Figure 5:
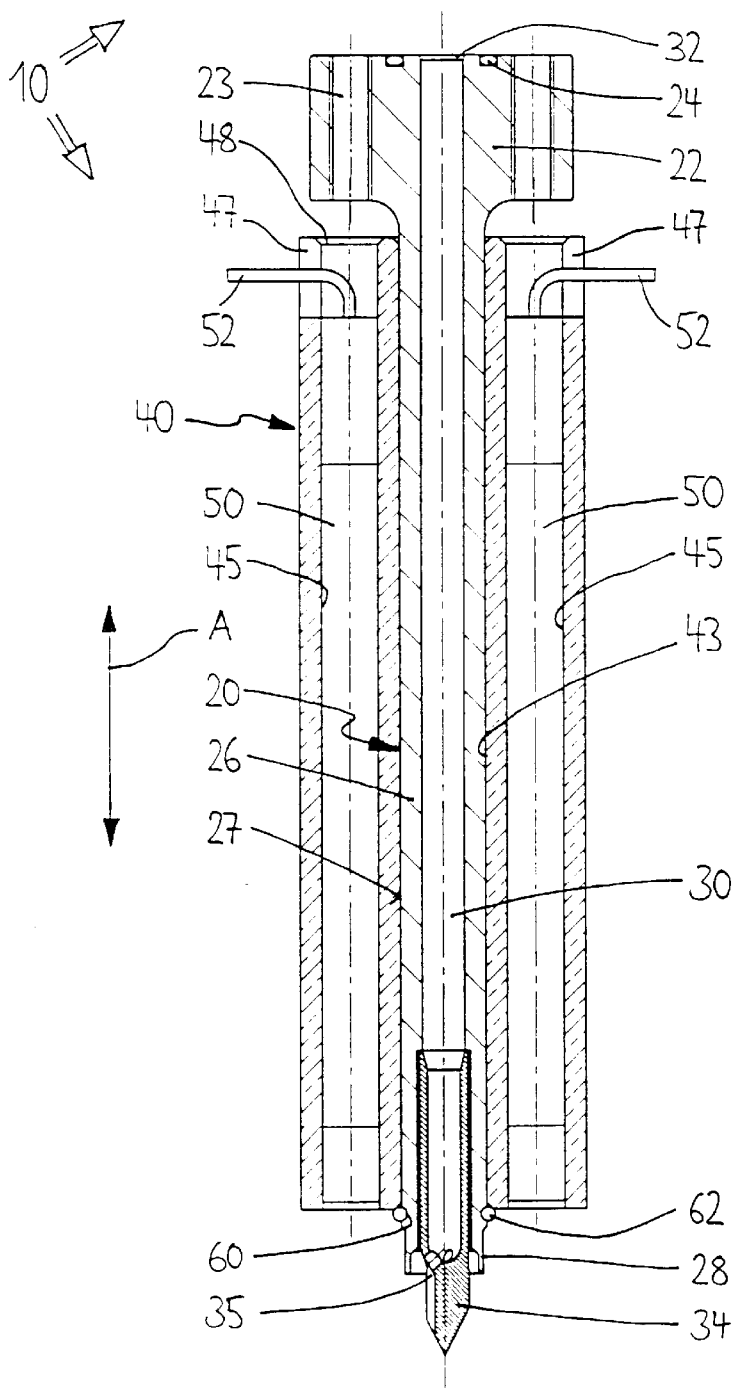
FIG. 5 is a lateral sectional view of still another embodiment of a hot runner nozzle.

In the embodiment shown in FIG. 3, two other receiving channels 45 for a heating cartridge 50 are provided on one side each in addition to the first receiving channel 43. In this way, the power density of the individual heating cartridges 50 may be reduced while the total heating power remains the same, which will have a positive effect on their service life. The same applies to the design of a heating channel nozzle 10 according to FIG. 5. In this embodiment, two other receiving channels 45 for heating cartridges 50 are arranged on either side of the first receiving channel 43 so that the material pipe 20 is located more or less symmectrically between the heating cartridges 50 of the heater 40.

Figure 6:
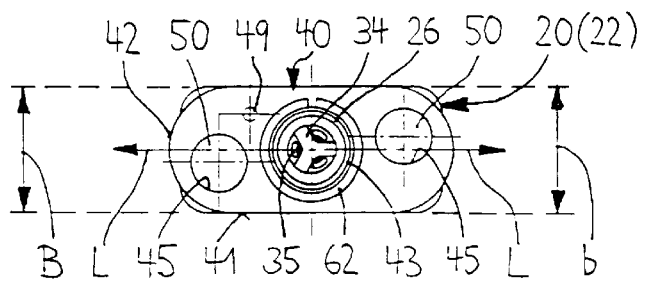
FIG. 6 is a bottom view of the hot runner nozzle in FIG. 5.

The receiving channels 43, 45 of the heater 40 may be arranged by groups aligned in the longitudinal direction L (see FIG. 4) in one plane E and/or—as shown in FIG. 6—be radially staggered at a right angle to the longitudinal direction L e.g. in order to provide enough space for the additional receiving channel 49 of the thermal sensor.

Because of the extremely flat design of the hot runner nozzles 10 at a right angle to the longitudinal direction L, they may be arranged in tight packing side by side, with their surfaces engaging each other. The spaces between the nozzle tips are thus reduced to a minimum so that extremely small gate spacings of just a few millimeters may be realized within the nozzle row. The flat heater 40 made separately from the material pipe 20 and of a highly heat-conductive material supplies the flow duct 30 with sufficient heat all around and down to the nozzle tip 35 in an extremely uniform way whereby the plastic material conveyed in the material pipe 20 is optimally heated.

Figure 7:
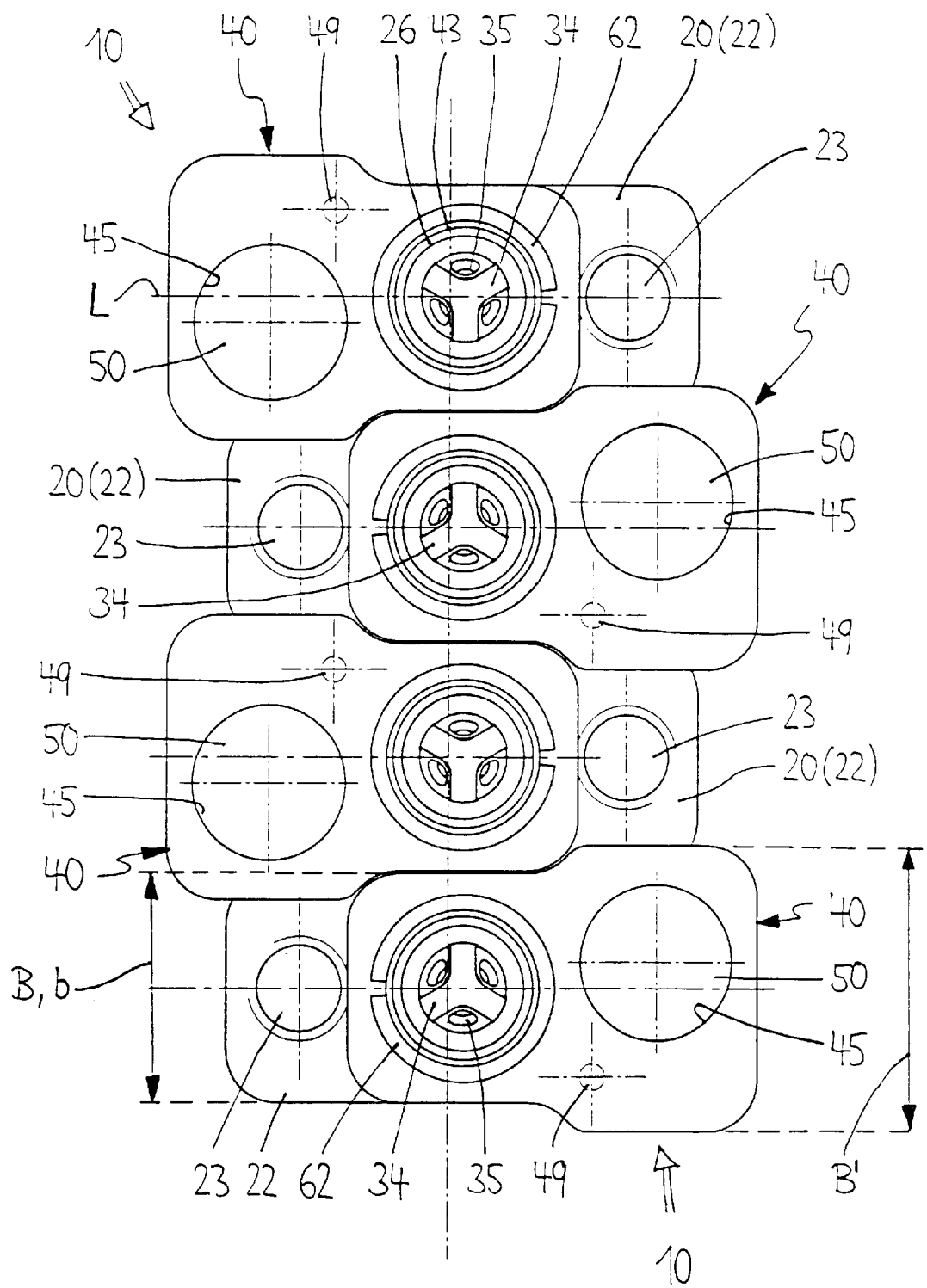
FIG. 7 is a multiple-nozzle arrangement seen from below and FIG. 8 is a top view of another embodiment of a multiple-nozzle arrangement.

An important further specialization of the invention will be evident from FIG. 7, wherein the cross-section of the solid block 40 is smaller in the zone of the first receiving channel 43 than in the zone of the other receiving channels 45. Thus in the zone of the material pipe 20 and the shaft 26, respectively, the heater 40 still has a width B which does not exceed the width b of the connecting head 22, whereas the solid block 40 has an increased width B' in the zone of the heating cartridges 50. Consequently these heating cartridges 50 may have much greater dimensions, and therefore they are less strained at the same temperature levels whereby an extremely positive effect on their service life is achieved.

Because of this special cross-sectional shape of the solid blocks 40, several hot runner nozzles 10 may be arranged—as shown in FIG. 7—such that the staggered heating cartridges 50 face each other. The spacings between the material pipes 20 and the nozzle tips 35, respectively, are not increased, i.e. extremely small cavity spacings may be realized even with bigger heating cartridges 50. The flat heaters 40 whose longitudinal surfaces 41 contact each other in the area of the receiving channels 43 ensure an always good and uniform heat distribution in the material pipes 20 which are preferably aligned. The transition from the width B to the width B' may be gradual as shown or by means of a step (not shown) worked into the lateral surface 41. It is, however, important that the lateral surfaces 41 be positively joined together so that the nozzles 10 can be arranged in closest packing.

Figure 8:
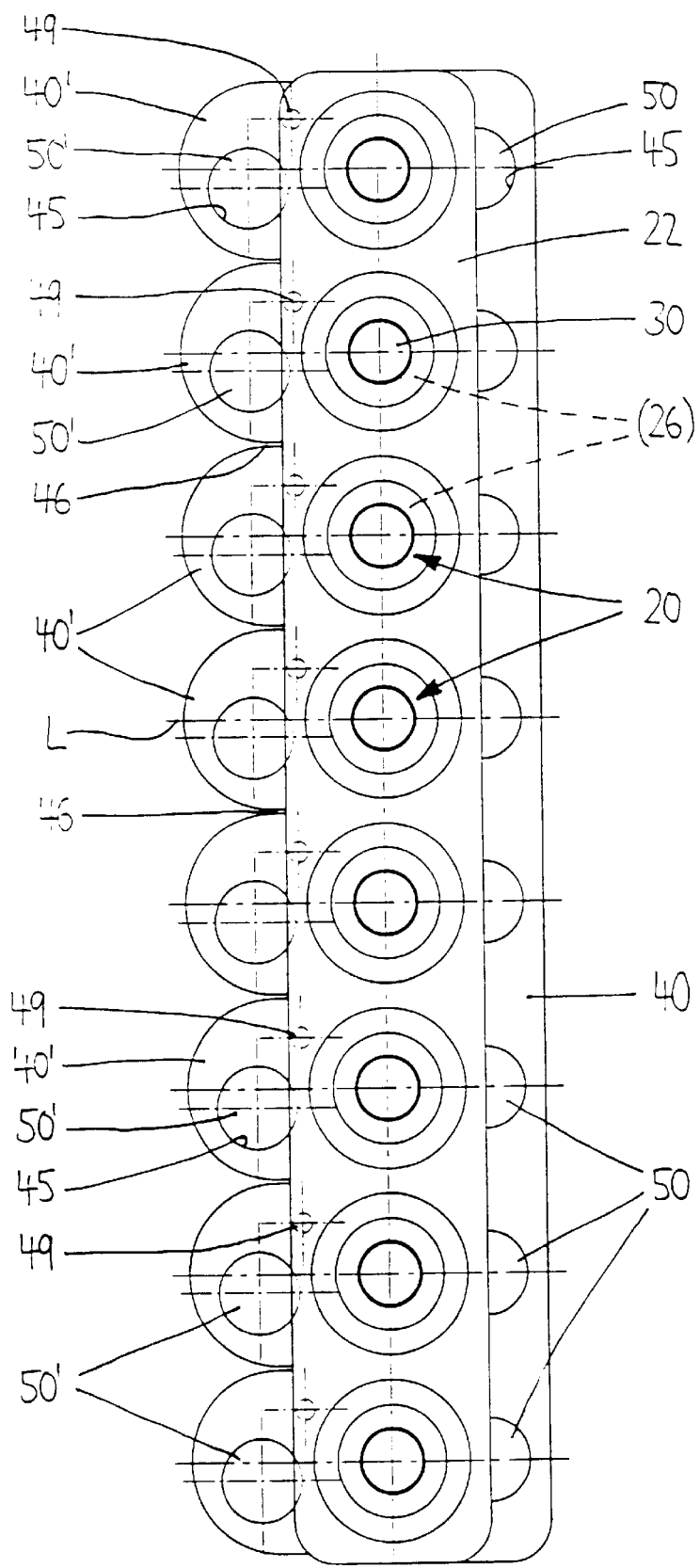

FIG. 8 shows another embodiment of the invention. On a base-like connecting piece 22, several shaft pieces 26 are provided in comb-like arrangement each of which may have its own solid-block heater 40 with one or several heating cartridges 50.

In the embodiment of FIG. 8, the solid blocks 40 on the righthand side form one piece, a separate receiving channel 43 (not shown here) being provided for each shaft piece of the material pipes 20. On either side of each material pipe 20, there are receiving channels 45 for heating elements 50, 50' so that the melt passed through the flow ducts 30 will be uniformly heated.

It is a specific feature of the heating 40 of FIG. 8 that the heating elements 50 seen in the drawing to the right of the material pipes 20 are located in the continuous part of the solid block 40 and are associated to a common heating control circuit (not shown). This circuit supplies a base load to the heating elements 50 and consequently to the material pipes 20. Heating cartridges 50' seen lefthand in the drawing of the material pipes 20 are located in separate sections 40' of the solid block 40 and are each connected to a separate control circuit. Each section 40' is thermally separated from the neighboring section by a small air gap 46 and is provided with its own receiving bore 49 for a temperature sensor. As a result, different temperatures may be generated within the individual flow ducts 30 as required.

Without in any manner being restricted to the embodiments described above, the invention can be modified in many ways. For example, heating cartridges 50 of angular cross-sections may be used, which are fitted non-positively or positively into corresponding receiving channels 45. These may be open at their ends or be closed by lids (not shown), e.g. to protect the electric heating cartridges 50 against influences from outside. Moreover, the heating blocks 40 may be fixed on the material pipes 20 by means of different locking or clamping elements 62 for non-positive or positive engagement in the solid block 40.

It will be seen that a hot runner nozzle 10 for an injection mold has a material pipe 20 made of a highly resistant material and is attachable to a mold or manifold, said pipe 20 including at least one melt flow duct 30 as well as a nozzle tip 34 at its lower end. A separate heating 40 in the form of a highly heat-conductive solid block is attached on the periphery of the material pipe 20 which is of circular cross section. In this solid block at least one other receiving channel 45 for a linear heating element 50 is provided on one side or on both sides of a first receiving channel 43 for the material pipe 20. The solid block 40, which may be fixed in relation to the material pipe 20, is a flat heater whose width B does not exceed the width b of the material pipe 20 at least in the zone of the first receiving channel 43. The heating element 50 is preferably a heating cartridge with electric connections 52 which are laterally led out of the solid block 40. An additional receiving channel 49 is provided for a temperature sensor.

All and any of the features and advantages of the invention, inclusive of design details, of spatial arrangements and of process steps, as evident from the claims, the specification and the drawings, may be inventionally substantial per se and in most variegated combinations.

List of Reference Symbols

A axial direction
B,B' width of solid block
b width of connecting head
E plane
L longitudinal direction
10 hot runner nozzle
20 material pipe
22 connecting head
23 tapped hole
24 seal
26 shaft piece
27 periphery
28 outer diameter step
30 melt flow duct
32 material inlet opening
34 nozzle tip
35 material outlet opening
40,40' heating/solid block
41 longitudinal side/surface
42 short side
43 first receiving channel
45 further receiving channel
46 air gap
47 opening
48 insertion opening
49 additional receiving channel
50,50' heating element
52 electric connection
60 peripheral groove
62 spring washer

What is claimed is:

1. Hot runner nozzle (10) for an injection mold, said nozzle comprising a material pipe (20) made of a high strength material, which may be mounted on a mold or a manifold and is provided inside with at least one flow duct (30) for a melt and at its lower end with a nozzle tip (34), said nozzle further comprising a heater (40) for the melt, said heater attached on the periphery of the material pipe (20), wherein the heater (40) is designed as a solid block made of a highly heat-conductive material and comprises a first receiving channel (43) for the material pipe (20) and at least one other receiving channel (45) having a linear heating element (50) positioned therein, which other channel is on a first axis substantially parallel and spaced apart from a second axis of the first receiving channel (43).

2. Hot runner nozzle according to claim 1, wherein at least two other receiving channels (45) for heating elements (50) are additionally provided on one side or both sides of the first receiving channel (43).

3. Hot runner nozzle according to claim 1, wherein the receiving channels (43,45) are aligned in one plane (E).

4. Hot runner nozzle according to claim 1, wherein the receiving channels (43, 45) are arranged staggered radially and/or in relation to a longitudinal direction (L).

5. Hot runner nozzle according to claim 1, wherein the solid block (40) has en essentially circular cross-section which is laterally flattened.

6. Hot runner nozzle according to claim 1, wherein the solid block (40) has an oblong, elliptical and/or angular cross-section.

7. Hot runner nozzle according to claim 1, wherein the cross-section of the solid block (40) is narrower in the zone of the first receiving channel (43) than in the zone of the other receiving channel(s) (45).

8. Hot runner nozzle according to claim 1, wherein the solid block (40) is a flat heater.

9. Hot runner nozzle according to claim 1, wherein the solid block (40) is made of copper or of a copper alloy, e.g. brass.

10. Hot runner nozzle according to claim 1, wherein the heating (50) is a heating cartridge having electric connections (52).

11. Hot runner nozzle according to claim 1, wherein the heating element (50) is a pipe segment through which a heating medium passes.

12. Hot runner nozzle according to claim 1, wherein the material pipe (20) has an essentially circular cross-section.

13. Hot runner nozzle according to claim 1, wherein the a connecting head (22) of the material pipe (20) is flattened or approximately angular and is provided with tapped holes.

14. Hot runner nozzle according to claim 1, wherein the width (B) of the solid block (40) does not exceed the width (b) of a connecting head (22) of the material pipe (20) at least in the zone of the first receiving channel (43).

15. Hot runner nozzle according to claim 1, wherein at least one additional receiving channel (49) for a temperature sensor is provided in the solid block (40).

16. Hot runner nozzle according to claim 1, wherein the solid block (40) is fixed in relation to the material pipe (20).

17. Hot runner nozzle according to claim 16, wherein the material pipe (20) is provided at its end with a peripheral groove (60) into which a clamping element (62) is positively inserted, the outer diameter of the clamping element (62) being greater than the outer diameter of the material pipe (20).

18. Hot runner nozzle according to claim 17, wherein the end of the solid block (40) rests on the clamping element (62).

19. Hot runner nozzle according to claim 17, wherein the clamping element (62) engages the solid block (40).

20. Hot runner nozzle according to claim 1, wherein the material pipe (20) further comprises a connecting piece (22) with a plurality of shaft pieces (26) extending therefrom, each shaft piece (26) located in the solid block (40).

21. Hot runner nozzle according to claim 1, wherein a portion of the solid block (40) is designed in sections, each section having an additional first receiving channel (43) having an additional material pipe (20) located therein and also having one other receiving channel (45) having an additional linear heating element (50) located therein.

22. Hot runner nozzle according to claim 1, wherein each heating element (50) is assigned to a separate control circuit.

23. Hot runner nozzle according to claim 2, wherein said heating elements (50) are associated to a common control circuit.

24. Multiple-nozzle arrangement comprising at least two hot runner nozzles according to claim 1, wherein the individual nozzles (10) are arranged in close packing side by side with the lateral surfaces contacting each other.

25. Multiple nozzle arrangement according to claim 24, wherein the material pipes (30) and the receiving channels (43), respectively, are aligned in one row.

* * * * *